United States Patent
Chang et al.

(10) Patent No.: US 9,241,141 B1
(45) Date of Patent: Jan. 19, 2016

(54) PROJECTION BLOCK EXTRACTION

(75) Inventors: Samuel Henry Chang, San Jose, CA (US); Christopher Coley, Morgan Hill, CA (US); Lynnda Gray, Los Gatos, CA (US); Petr G. Shepelev, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1030 days.

(21) Appl. No.: 13/336,458

(22) Filed: Dec. 23, 2011

(51) Int. Cl.
*H04N 7/18* (2006.01)

(52) U.S. Cl.
CPC ............... *H04N 7/183* (2013.01); *H04N 7/181* (2013.01)

(58) Field of Classification Search
CPC ......... H04N 7/181; H04N 7/183; H04N 7/18; H04N 7/188; G08B 13/19656
See application file for complete search history.

(56) References Cited

U.S. PATENT DOCUMENTS

| | | | |
|---|---|---|---|
| 5,715,325 A * | 2/1998 | Bang et al. | 382/118 |
| 8,184,200 B1 * | 5/2012 | Biswas et al. | 348/459 |
| 8,570,320 B2 * | 10/2013 | Izadi et al. | 345/420 |
| 2002/0024640 A1 * | 2/2002 | Ioka | 353/94 |
| 2009/0066690 A1 * | 3/2009 | Harrison | 345/419 |
| 2010/0302413 A1 * | 12/2010 | Kawashima | 348/241 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Tat Chio
(74) *Attorney, Agent, or Firm* — Lee & Hayes, PLLC (57) ABSTRACT

Sensing systems using projection blocks of structured light provide useful information about the surfaces they are projected onto. A camera captures an image which contains a captured block, that is, an image of the projection block interacting with the surface. Corrections may be applied to the captured image to compensate for distortions produced by projector and/or camera systems and produce a corrected image. Noise may be removed from the corrected image using a bilateral filter, producing a filtered image. The filtered image may be processed to determine a boundary of the captured block.

18 Claims, 8 Drawing Sheets

PROJECTION BLOCK EXTRACTION

BACKGROUND

Augmented reality environments allow interaction among users and real-world objects and virtual or computer-generated objects and information. This merger between the real and virtual worlds paves the way for new interaction opportunities and sensing capabilities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

An augmented reality system may be configured to interact with objects in a scene and generate an augmented reality environment. The augmented reality environment allows for virtual objects and information to merge and interact with tangible real-world objects, and vice versa. Disclosed herein are techniques and devices suitable for projecting a structured light pattern onto one or more objects and determine a border of the structured light pattern as projected. A captured image may be corrected to account for distortions introduced by a projection system, camera system, or both. This corrected image may be filtered using a bilateral filter to reduce or remove noise in the image. A boundary of the structured light pattern as present in the resulting filtered image may then be recovered. The filtered image and the boundary may then be used to determine one or more characteristics about the object's surface, such as the topography of the surface, a distance between the object and the augmented reality system, a position of the object within the environment, and so forth.

As described herein for illustration and not by way of limitation, the augmented reality environment may be provided at least in part by a combination of a structured light source, such as an image projector or other light source configured to generate structured light patterns, and a camera to image those patterns. The projector and camera may further be incorporated into a single unit and designated as an augmented reality functional node (ARFN). In other implementations, other combinations of elements such as projectors, video displays, computer screens, cameras, microphones, ultrasound transducers, depth-sensing devices, weight sensors, touch sensors, tactile output devices, and so forth may be also be present within or coupled to the ARFN.

As used herein, a structured light pattern as projected by a projector onto a surface is designated a "projected block." A captured image acquired by a camera containing the structured light pattern interacting with one or more objects or surfaces in the environment is designated a "captured block."

The augmented reality system includes a computing device with an augmented reality module configured to support the augmented reality environment. The augmented reality module may contain, or couple to, several modules. A block acquisition module determines a boundary of the captured block and a bilateral filter module is used to apply a bilateral filter which may reduce or eliminate noise in the captured image. The noise removed from the captured block by the bilateral filter improves recovery of signals in the captured block corresponding to the structured light pattern. A boundary of the captured block may be determined, at least in part by looking for transitions in the structured light pattern. Filtered image, boundary data, or both may then be used to determine topography of objects within the scene, position, orientation, distance, and so forth. In some implementations, a mapping or transformation may be applied to the captured block to form a corrected block. This transformation results in a correspondence between points in the captured block and in the projection block.

Illustrative Environment

Figure 1:
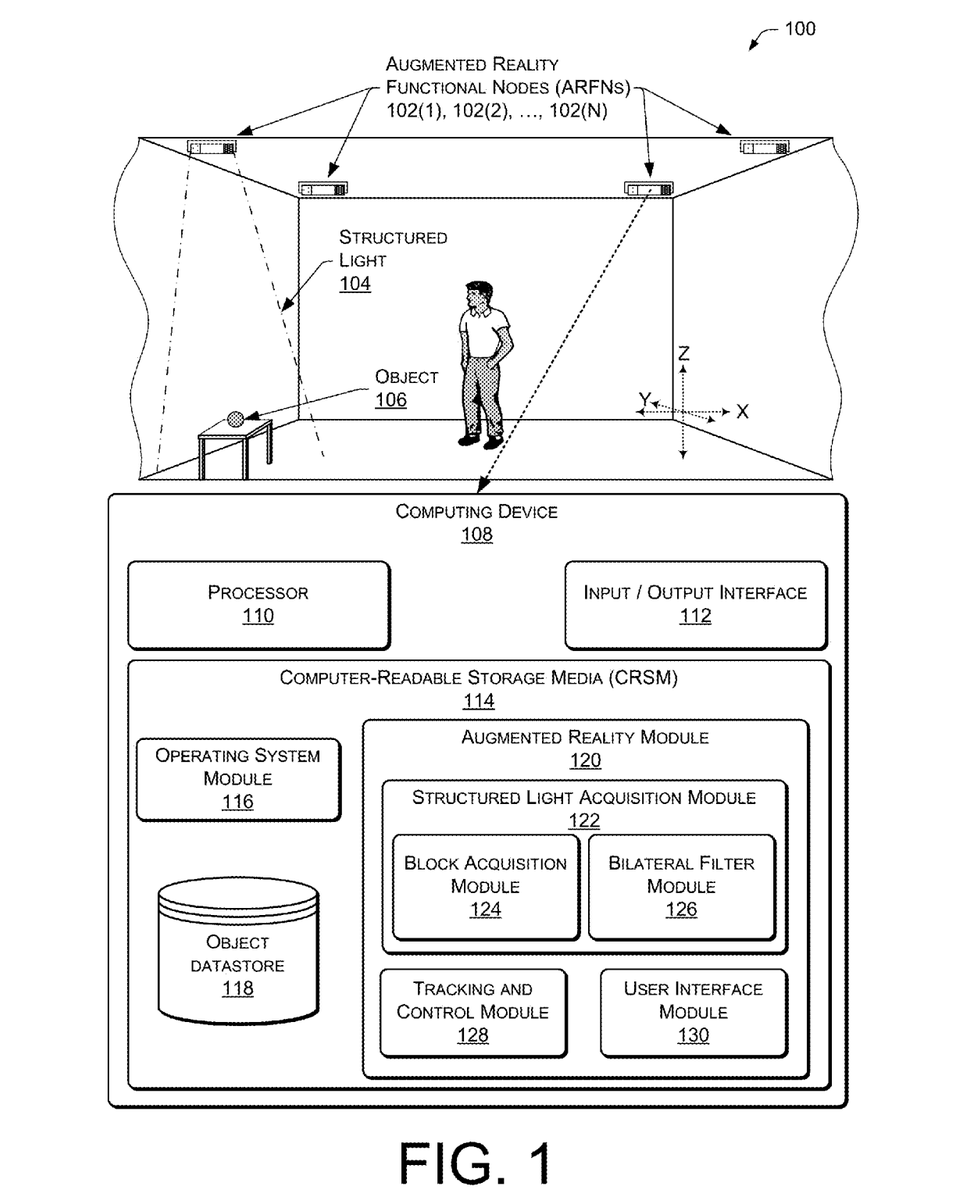
FIG. 1 shows an illustrative augmented reality environment which includes an augmented reality functional node and an associated computing device storing or having access to a block acquisition module.

FIG. 1 shows an illustrative augmented reality environment 100. The environment 100 includes one or more augmented reality functional nodes (ARFNs) 102(1), 102(2), . . . , 102(N) with associated computing devices. In this illustration, multiple ARFNs 102(1)-(N) are positioned in the corners of the ceiling of the room. In other implementations, the ARFNs 102(1)-(N) may be positioned in other locations within the environment. When active, one such ARFN 102 may generate an augmented reality environment incorporating some or all objects in the environment such as real-world objects. In some implementations, more or fewer ARFNs 102(1)-(N) than shown here may be used.

The ARFNs 102 may use structured light 104 to scan an object 106. This scan may comprise projecting one or more structured light patterns onto the scene in the environment and imaging the patterns during interaction with the object. Structured light is described in more detail below.

Each of the ARFNs 102(1)-(N) couples to or includes a computing device 108. This computing device 108 may be within the ARFN 102, or disposed at another location and connected to the ARFN 102. The computing device 108 comprises a processor 110, an input/output interface 112, and a computer-readable storage media (CRSM) 114. The processor 110 may comprise one or more processors configured to execute instructions. The instructions may be stored in the CRSM 114, or in other computer-readable storage media accessible to the processor 110.

The input/output interface 112 may be configured to couple the computing device 108 to other components such as projector, cameras, microphones, other ARFNs 102, other computing devices, other devices within the augmented reality environment, and so forth. For example, the input/output interface 112 may be configured to exchange data with computing devices, cleaning robots, home automation devices, and so forth in the environment. The coupling between the computing device 108 and the devices may be via wire, fiber optic cable, or wireless connection including but not limited to radio frequency, optical, or acoustic signals.

The computer-readable storage media 114 includes any available physical media accessible by a computing device to implement the instructions or read the data stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the CRSM 114 and configured to execute on a processor, such as the processor 110. An operating system module 116 is configured to manage hardware and services within and coupled to the computing device 108 for the benefit of other modules. Modules may be stored in the CRSM 114 of the ARFN 102, storage devices accessible on the local network, cloud storage accessible via a wide area network, or distributed across a combination thereof.

An object datastore 118 is configured to maintain information about objects within or accessible to the augmented reality environment or users. These objects may be tangible real world objects or virtual objects. Tangible objects include items such as tables, chairs, animals, plants, food containers, printed books, and so forth. Virtual objects include media content such as songs, movies, electronic books, computer generated scenes, media files, and so forth. Virtual objects may include stored copies of those objects or access rights thereto. The object datastore 118 may include a library of pre-loaded reference objects, as well as objects which are temporally persistent within a particular environment, such as a wall, a specific table, a user and so forth. For tangible objects, surface shapes, textures, colors, and other characteristics may be stored.

The object datastore 118 or other datastores may be stored on one or more of the CRSM 114 of the ARFN 102, storage devices accessible on the local network, cloud storage accessible via a wide area network, or distributed across one or more of these. Data within the object datastore 118 may be stored in hierarchical, non-hierarchical, or hybrid arrangements.

An augmented reality module 120 is configured to maintain an augmented reality environment in concert with the physical environment. The module 120 may access datastores such as the object datastore 118.

The augmented reality module 120 includes a structured light acquisition module 122. The structured light acquisition module 122 is configured to direct a projector and a camera (such as described below with regards to FIG. 2) to project one or more structured light patterns or "projected blocks" onto the object 106 and acquire images of the structured light pattern as it interacts with the object, also known as "captured blocks."

The structured light patterns may be regular, irregular, pseudo-random noise, and so forth. For example, a regular structured light pattern may comprise a set of bars having alternate intensities, colors, and so forth. When projected onto an object in the environment, this pattern may shift, distort, or change in size after interacting with the object. These patterns may include features having edges, fiducials, or other distinctive arrangements which may be used to provide for recovery of the originally projected pattern and determination of corresponding distortion. As used herein, an edge is a transition from one state to another, such as a first pixel having a high intensity (bright) adjacent to a second pixel having a low intensity (dim). The low intensity may be non-zero. For example, the edge may be visualized as an interface between a bright bar and a dim bar in a projected pattern. A boundary is the interface between the structured light pattern and non-structured light portions in the captured image. For example, the boundary is the perimeter of the structured light pattern as projected in the environment. Structured light patterns are discussed in more detail below with regards to FIG. 3.

The structured light acquisition module 122 may comprise a block acquisition module 124. The block acquisition module 124 is configured to recover the structured light pattern in the captured image. The block acquisition module 124 utilizes knowledge about the structured light pattern which is projected and inspects captured images to recover that pattern. Once recovered, the boundary of the captured block is determined. The positions of features within the structured light patterns may be readily ascertained and used for characterization of objects within the environment.

The block acquisition module 124 may correct the captured image to account for distortions introduced by a projector system projecting the projection block, a camera system acquiring images, and so forth. Corrections relating to the projection and camera systems are discussed below in more detail with regards to FIGS. 4-6.

The projection block module 124 may be configured to determine at least a portion of a boundary of the captured block in the captured image. Recovery of signals associated with the captured block may be improved using a bilateral filter as discussed next.

The structured light acquisition module 122 may incorporate a bilateral filter module 126. The bilateral filter module 126 is configured to apply a bilateral filter to at least a portion of the captured image to improve recovery of the structured light pattern. The bilateral filter may operate to replace an intensity value of a pixel within a filtered region with a weighted average of intensity values from its neighborhood pixels within a pre-determined window centered by the pixel. The bilateral filter preserves edges of features in the structured light pattern and reduces noise present in the captured image. In one implementation, the bilateral filter module 126 may implement the following equation where I is the captured image, p the pixels in I, W a selected window size, q the points within the window, S the sub space containing all windows, and G is a Gaussian function.

$$BF[I]_p = \frac{1}{W_p} \sum_{q \in S} G_{\sigma_s}(\|p-q\|) G_{\sigma_r}(|I_p - I_q|) I_q \quad \text{(Equation 1)}$$

In one implementation, where the structured light pattern or projected block comprises alternating bars of a first and second intensity, width "w" may comprise a width in pixels of the bars.

The block acquisition module 124 may be configured to generate a transform or mapping between the captured block and the projection block. The transform or mapping establishes a correspondence between one or more points in the captured block to corresponding points within the projection block. For example, four corners of a captured block may be associated with four corners of a projection block. In one implementation, this transform may be used to de-skew the acquired structured light pattern.

The augmented reality module 120 may include a tracking and control module 128 configured to identify objects including users, and follow their location in the environment. This identification may include the use of a camera, structured light, radio frequency identification equipment, communication with the object, and so forth within the ARFN 102. Objects may be identified by comparing attributes in the object datastore 118 such as shape, text thereon, universal product code (UPC), object behaviors (including an ability to move independently), optical barcode, radio frequency identification tag (RFID), and so forth. Where the object is capable of communication, it may exchange information with the ARFN 102, and such information may be stored within the object datastore 118. The tracking and control module 128 may also be configured to send instructions or commands to other devices, such as environmental controls, lighting, robots, and so forth.

A user interface module 130 may be in the augmented reality module 120 which is configured to accept and interpret input such as received by the tracking and control module 128 and the structured light acquisition module 122 and generate output for the user. The ARFN 102 may use a camera, structured light, stereoscopic vision, and so forth to read the input from the user. This input may also comprise hand or facial gestures determined by the structured light acquisition module 120. The user interface module 130 may perform functions such as initiating a query of the object datastore 118. For example, a user may query the object datastore 118 via the user interface module 130 to locate his misplaced sunglasses.

Figure 2:
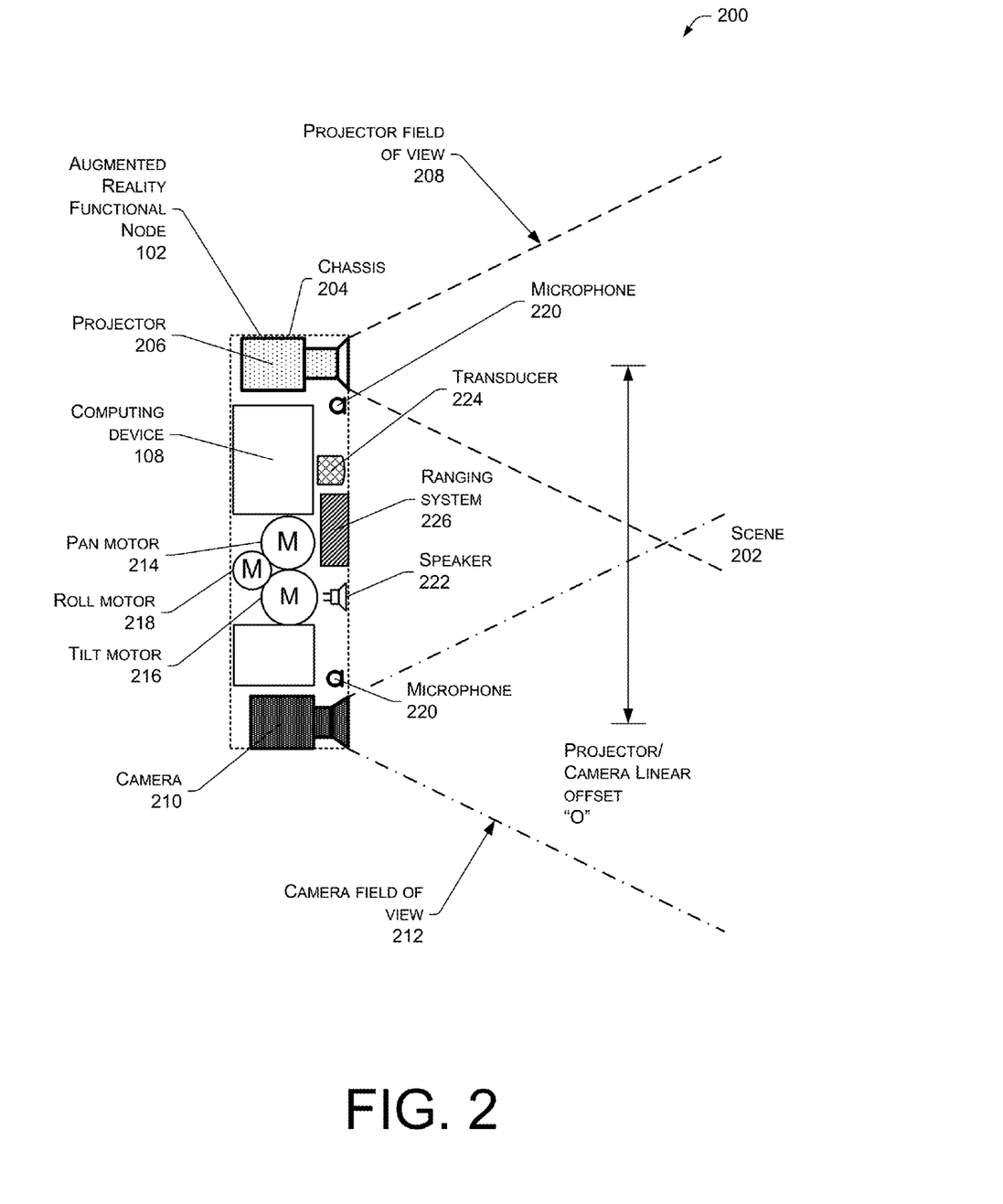
FIG. 2 shows an illustrative augmented reality functional node that includes a computing device, along with other selected components configured to generate and maintain an augmented reality environment.

FIG. 2 shows an illustrative schematic 200 of one example augmented reality functional node 102 and selected components. The ARFN 102 is configured to scan at least a portion of a scene 202 and the objects therein, such as the object 106 sitting on the table as shown in FIG. 1. The ARFN 102 may also be configured to provide augmented reality output, such as images, sounds, and so forth.

A chassis 204 holds the components of the ARFN 102. Within the chassis 204 may be disposed a projector 206 that projects images onto the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 or other displays such as televisions, monitors, and so forth may be used.

A camera 210 may also be disposed within the chassis 204. The camera 210 is configured to image the environment in visible light wavelengths, non-visible light wavelengths, or both. For example, in one implementation the camera 210 may be configured to generate a thermal image as well as a visible light image. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, a roll motor 218, and so forth. The pan motor 214 is configured to rotate the chassis 204 in a yawing motion. The tilt motor 216 is configured to change the pitch of the chassis 204. The roll motor 218 is configured to rotate the chassis 204 in a rolling motion. By panning, tilting, and/or rolling the chassis 204, different views of the environment may be acquired.

One or more microphones 220 may be disposed within the chassis 204, or elsewhere within the environment. These microphones 220 may be used to acquire input from the user, for echolocation, location determination of a sound, or to otherwise aid in the characterization of and receipt of input from the environment. For example, the user may make a particular noise, such as a tap on a wall or snap of the fingers, which are pre-designated as attention command inputs. The user may alternatively use voice commands. Such audio inputs may be located within the environment using time-of-arrival or other techniques among the microphones.

One or more speakers 222 may also be present to provide for audible output. For example, the speakers 222 may be used to provide output from a text-to-speech module or to playback pre-recorded audio.

A transducer 224 may be present within the ARFN 102, or elsewhere within the environment, and configured to detect and/or generate inaudible signals, such as infrasound or ultrasound. For example, the transducer 224 may be configured to detect a characteristic ultrasonic sound signature produced by keys on a keyring. Inaudible signals may also be used to provide for signaling between accessory devices and the ARFN 102.

A ranging system 226 may also be provided in the ARFN 102. The ranging system 226 is configured to provide distance information from the ARFN 102 to a scanned object or set of objects. The ranging system 226 may comprise radar, light detection and ranging (LIDAR), ultrasonic ranging, stereoscopic ranging, and so forth. In some implementations the transducer 224, the microphones 220, the speaker 222, or a combination thereof may be configured to use echolocation or echo-ranging to determine distance and spatial characteristics.

In this illustration, the computing device 108 is shown within the chassis 204. However, in other implementations all or a portion of the computing device 108 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the environment. The known projector/camera linear offset "O" may also be used to calculate distances, for providing an offset source for photometric stereo, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 220 and speakers 222 may be distributed throughout the environment. The projector 206 and the camera 210 may also be located in separate chassis 204. The ARFN 102 may also include discrete portable signaling devices used by users to issue inputs. These signal devices may be acoustic clickers (audible or ultrasonic), electronic signaling devices such as infrared emitters, radio transmitters, and so forth.

Figure 3:
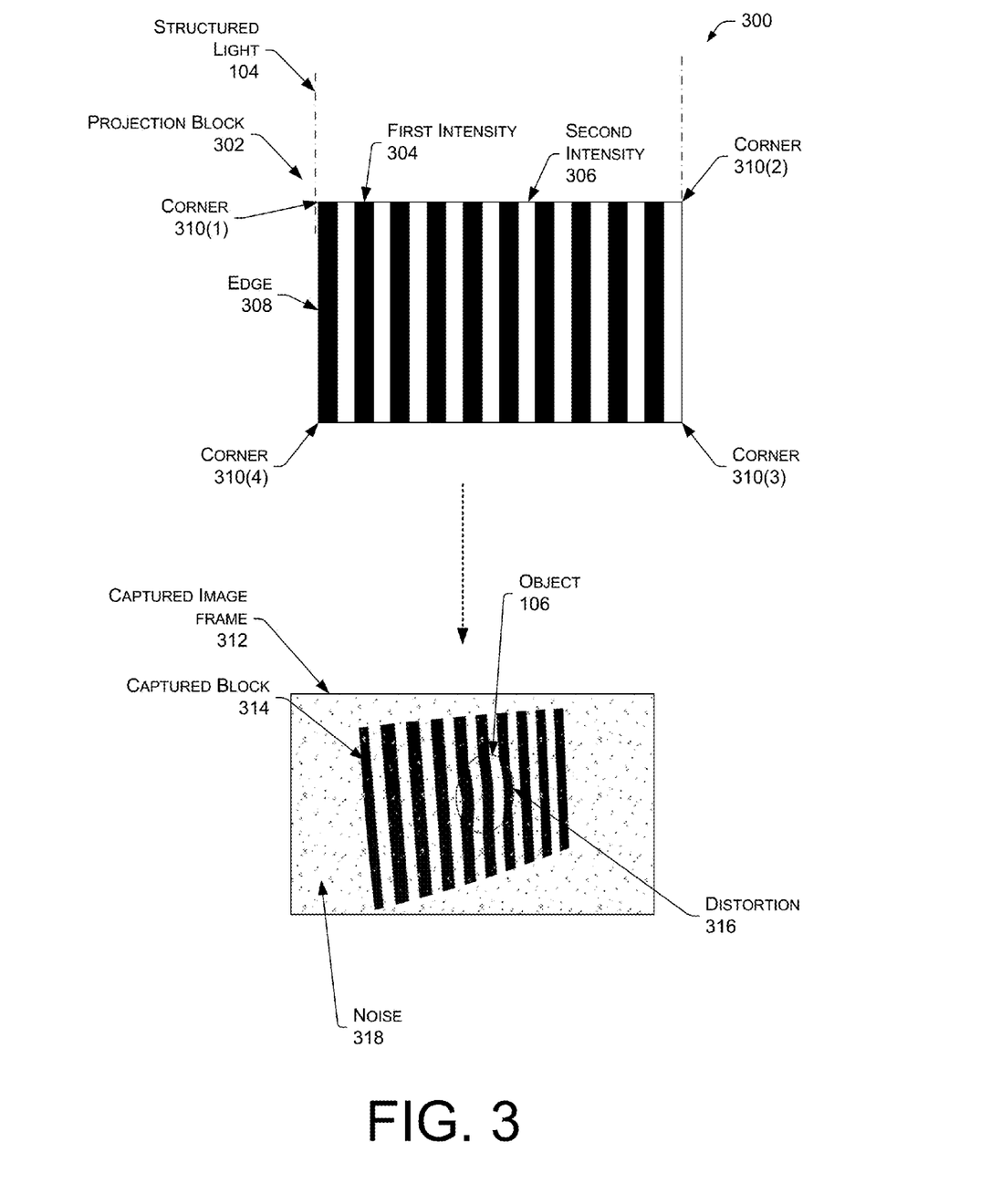
FIG. 3 illustrates parts of a captured image.

FIG. 3 illustrates parts 300 of a captured image. Structured light uses projection of one or more known structured light patterns such as the projection block 302 onto the scene 202. For example, as shown here the projector 206 may project the structured light 104 onto the object 106.

The projection block 302 comprises a structured light pattern, such as depicted herein. The pattern shown here comprises a series of vertical bars with intensities alternating between a first intensity 304 and a second intensity 306. In other implementations, other patterns may be used such as grids, points, pseudorandom noise, checker board, and so forth. The structured light patterns described herein may be projected using visible light, non-visible light, or a combination thereof. Non-visible light comprises light which is not visible to the unaided human eye, such as infrared or ultraviolet. These patterns may contain a plurality of edges 308. In some implementations, the patterns may incorporate one or more fiducial markers (or fiducials) which may act as a point of reference in the pattern. These fiducials may be distributed at the corners 310, along the boundary, within the boundary, and so forth.

The structured light patterns may be projected using visible light and configured such that they are imperceptible to the human eye. For example, a duration of time during which one pattern is projected may be below a perception threshold of a human user. Or in another implementation a series of inverted or complementary patterns may be projected such that over an integration time of the human eye, the structured light pattern is not perceived. These complementary patterns contain opposing excursions in luminance, chrominance, or luminance and chrominance. For example, a first pattern may contain a pixel with a luminance of +2 while the second pattern may have the pixel set to a luminance of −2.

A projection duration of a first structured light pattern and a second structured light pattern may differ. For example, the first structured light pattern may be presented for 10 milliseconds (ms) while the second structured light pattern is presented for 12 ms.

In some implementations, the first intensity 304 shown here may correspond to a non-zero intensity level. The second intensity 306 may correspond to an intensity different from the first intensity 304 and up to a maximum intensity value. The intensity may be for a specific color of light, or overall luminance. In some implementations, structured light patterns with different colors may be used. This may improve acquisition of surface data when modeling objects which exhibit limited intensity changes in images of a particular color. For example, a red ball may be best imaged in green light.

The edges 308 may be determined where the intensity changes above a pre-determined threshold from one pixel to the next. Disposed around a boundary or perimeter of the rectangular projection block 302 shown here are four corners 310(1)-310(4).

A captured image frame 312 is shown. The camera 210 recovers the captured image frame 312 which comprises an image of the object 106, as well as other portions of the scene 202 in the field of view, and the projected structured light 104. By determining how the structured light 104 patterns have been distorted or shifted, a shape of the object 106 may determined. A distance to the object 106, topography of the surface of the object may be determined by assessing features within the patterns.

Within the captured image frame 312 is a captured block 314. The captured block 314 includes the structured light pattern as presented and interacting with the object 106. Distortion 316 of at least a portion of the structured light pattern resulting from this interaction with the object 106 is illustrated. The captured block 314 shows some distortions such as introduced by optical elements of the projector 206, the camera 210, and so forth. For example, the edges 308 of the projection block 302 are straight, the edges captured block 314 are slightly curved. The projection pattern position distortion over the object in the block may be referred to as a "disparity." The disparity is a combination of projection pattern disparity, image capture distortion, and projection distortion. Also depicted is noise 318 in the captured image frame 312. This noise 318 includes noise, distortions to the image, and otherwise includes deviations from an ideal projection or ideal image.

The noise 318 may be from one or more sources. The projector 206 may introduce projection noise during generation of the projection block 302. This distortion may include optical distortions, electronic noise in an imaging element, and so forth. Projection distortion factors are discussed below in more detail with regards to FIG. 6. The camera 210 may also introduce camera noise when acquiring the captured image with the captured block. The camera noise may include distortions from some optical elements, distortion due to imaging sensor element alignment, and so forth. Camera distortion factors are discussed in more detail below with regards to FIG. 5. In some implementations, the captured image frame 312 may include the captured block 314 in its entirety, thus the entire boundary of the structured light appears within the frame.

Figure 4:
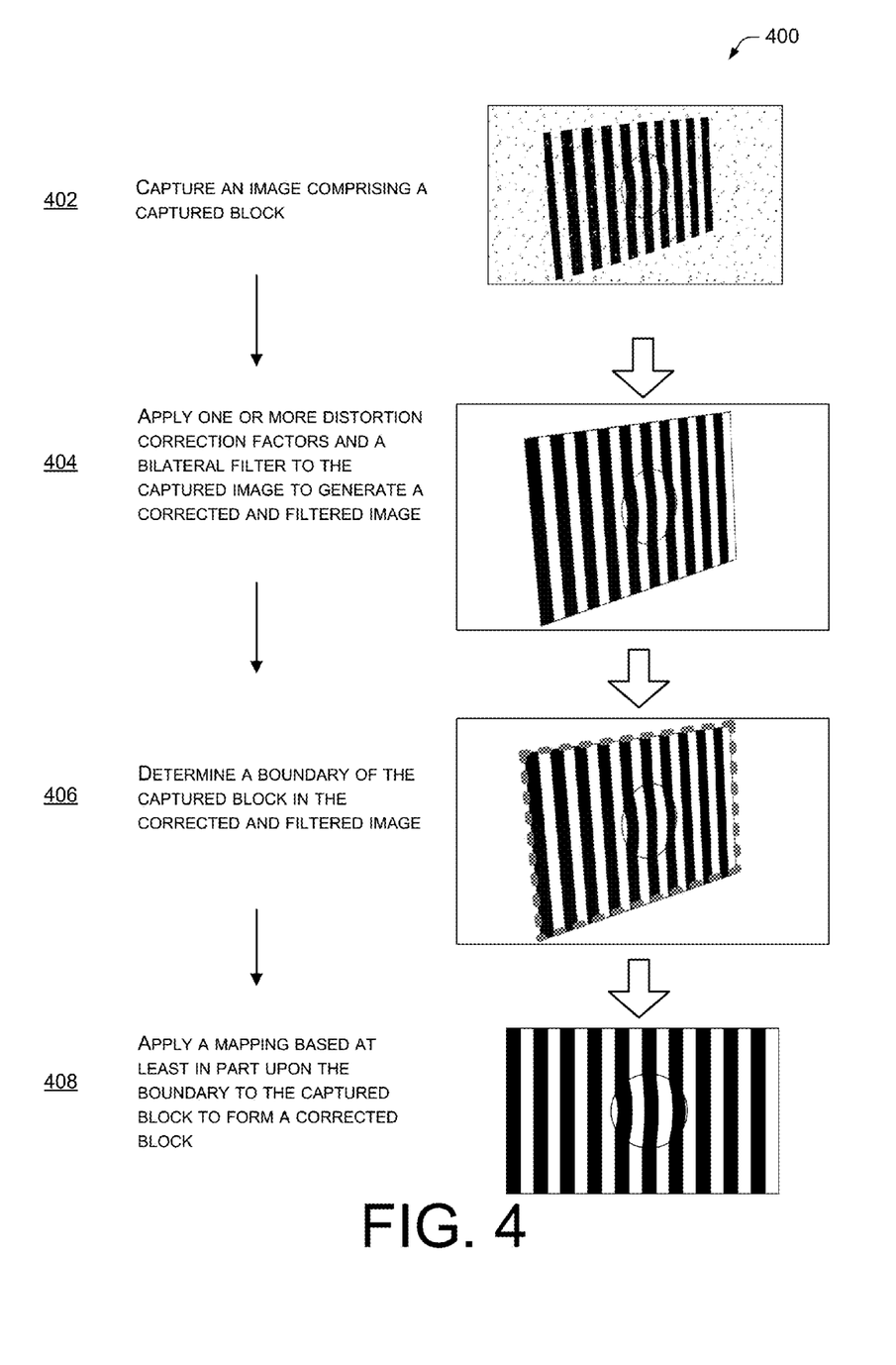
FIG. 4 illustrates operations to determine a boundary and generate a corrected block.

FIG. 4 illustrates operations 400 to determine a boundary of a captured block and generate a corrected image. In some implementations an entire boundary may be determined, while in other implementations at least a portion of the boundary may be determined. At 402, an image frame 312 is captured which comprises a captured block 312. As mentioned above, the captured image frame 312 may include noise 318. The noise 318 increases the difficulty recovering signals associated with the structured light pattern. For example, the noise 318 may obscure or displace the edges 308 resulting in errors when analyzing the structured light pattern to determine characteristics about the object 106.

At 404, one or more distortion correction factors are applied to the captured image, as well as a bilateral filter to generate a filtered and corrected image. The distortion correction factors adjust the captured image to remove distortions such as the pixel distortions in the images captured by the camera 210 with projection patterns from the projector 206, and so forth. As described above, the bilateral filter such as provided by the bilateral filter module 126 removes or reduces noise in the captured image 312 while retaining edges 308.

At 406, a boundary of the captured block 314 in the captured image 312 is determined. In this illustration, the determined boundary is indicated by a broken line around a perimeter of the captured block 314. Because the noise 318 has been reduced due to the distortion correction and filtering, recovery of a signal resulting from the structured light pattern is improved. In one implementation, signal differences resulting from variations at the edges 308 between features in the structured light pattern having the first intensity 304 and the second intensity 306 features and a background may be used to detect the boundary. Detection of the boundary is described below in more detail with regards to FIG. 8.

In some implementations, the position of features such as the edges 308, the corners 310, fiducials, and so forth may be interpolated. When the captured image frame 312 contains a captured block 314 which does not include all of the features expected, the position of those corners or fiducials may be interpolated. For example, where the captured block 314 comprises corners 310(1), 310(2), and 310(3), but corner 310(4) is not present, the location of 310(4) may be interpolated based on an extension of the boundary lines for the portion of the captured block 314 which is present in the captured image frame 312. This interpolation may also incorporate data such as the relative displacement in the captured image 312 of features in the pattern. Thus, in some implementations recognition and extraction of a partial captured block 314 is facilitated.

At 408, in some implementations a mapping or transform based at least in part upon the boundary may be determined and applied to the captured block to form a corrected block. This mapping provides a correspondence between pixels in the projection block 302 and the captured block 314. In one implementation, the mapping may be used to rectangularize or reshape the captured block to conform to the boundary of the projection block 302. In some implementations, transform components or coefficients describing the mapping may be used to determine one or more characteristics about the object 106 or surfaces in the captured block 314. For example, where the mapping comprises a transform function, the coefficients of the transform may be used to determine or define an orientation of the tabletop relative to the ARFN 102.

Figure 5:
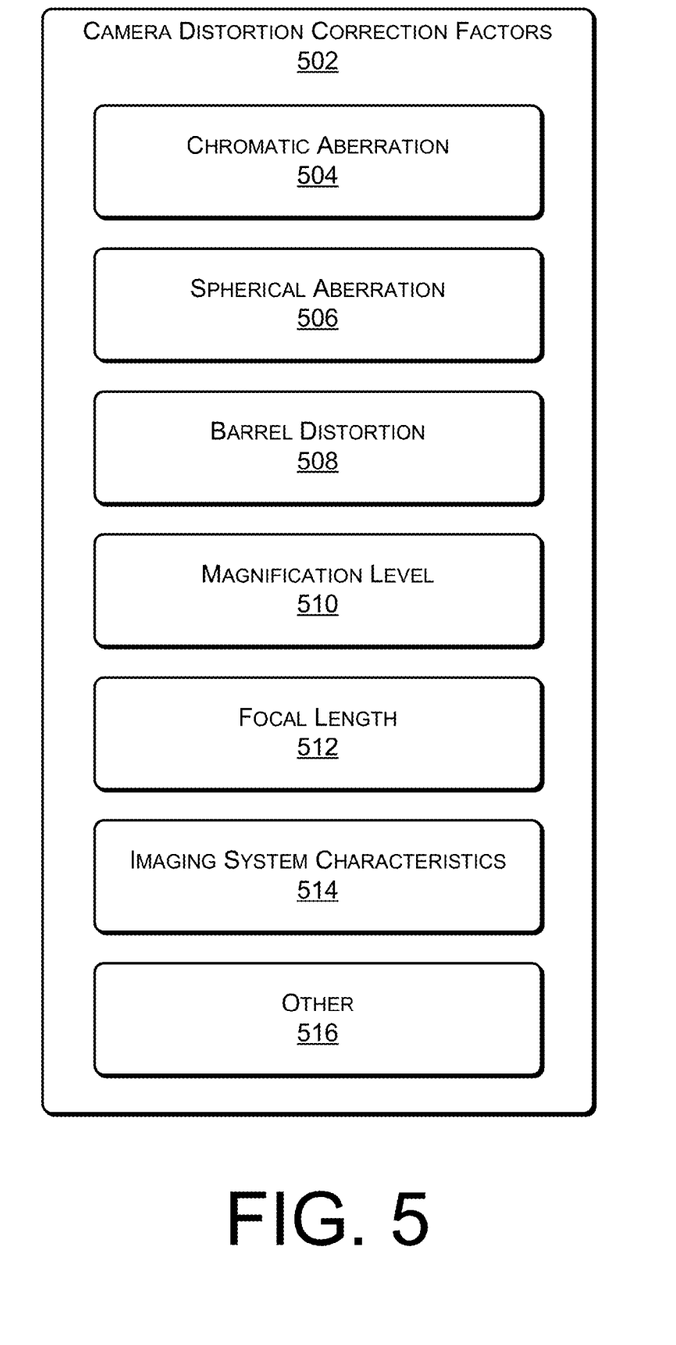
FIG. 5 illustrates camera distortion factors which may be used to correct an image acquired by the camera which contains the captured block.

FIG. 5 illustrates camera distortion correction factors 502 which may be present in the camera 210 system. These camera distortion correction factors 502, when identified in the camera 210 system, may be used to correct the captured image 312 acquired by the camera 210. The camera distortion correction factors 502 may be determined computationally, experimentally such as during quality assurance testing, with a calibration process, or a combination thereof.

The camera distortion correction factors 502 may include chromatic aberration 504, spherical aberration 506, barrel distortion 508, and so forth which may result from use of optical elements in an optical system of the camera 206 system. These optical elements may include lenses, mirrors, prisms, diffraction gratings, shutters, and so forth. Magnification level 510 of the optical system may be considered in determining camera distortion factors, as well as focal length 512. Imaging system characteristics 514 such as image processing algorithms, noise compensation, pixel arrangement, and so forth may also be corrected for. Other 516 camera distortion factors may also be considered, such as nonlinearity in an imaging sensor, distortion resulting from readout of the imaging sensor, and so forth.

Figure 6:
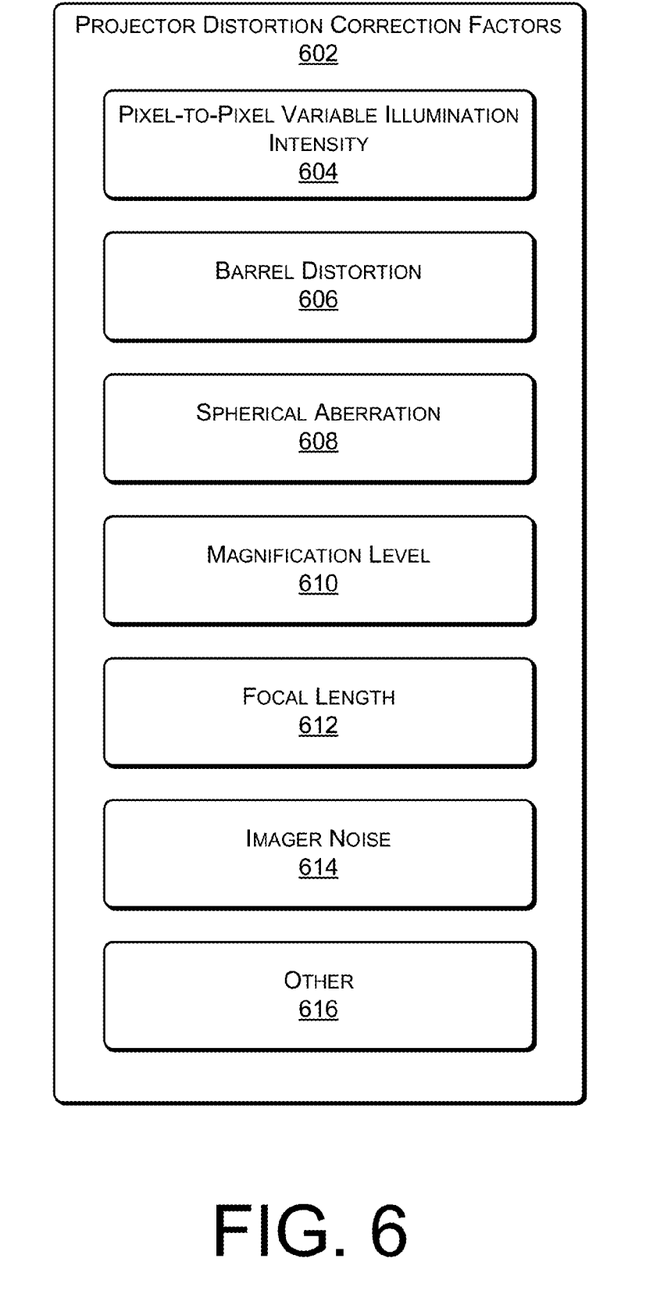
FIG. 6 illustrates projector distortion factors which may be used to correct the captured image.

FIG. 6 illustrates projector distortion correction factors 602 which may be used to correct the captured image 312. During projection of the projection block 302 onto the scene 202 the projection process causes the projection block 302 as stored in the CRSM to differ from the structured light pattern as actually presented.

A pixel-to-pixel variable illumination intensity may be experienced which introduces distortion into the intensity of the projected pixels. For example, pixels in the center of the projected image may be brighter than pixels around the edges of the projected image. By accounting for this pixel-to-pixel variable illumination intensity 604, a signal-to-noise ratio associated with the structured light pattern may be improved.

Optical distortions such as a barrel distortion 606, spherical aberration 608, and so forth may be accounted for. These distortions displace the edges 308 within the captured block 314. These displacements may result in erroneous results in the analysis of the surface. For example, curvature in otherwise straight edges 308 due to barrel distortion 606 may result in an erroneous determine that the surface onto which the structured light pattern is non-planar. Magnification level 610 and focal length 612 may also be considered.

In some implementations, imager noise 614 may considered during image correction. Imager noise 614 comprises errors introduced during formation of the image by the imaging element in the optical assembly of the projector 206. For example, a digital micromirror device may differentially deflect different colors of light associated with a particular pixel at different angles. This may result in incorrect placement of features in the structured light pattern. As above, this may result in incorrect assessments by the structured light acquisition module 122 of the surface onto which the structured light pattern is projected. In addition to those mentioned here, other 616 projector distortion factors may be considered during image correction.

Illustrative Processes

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 7:
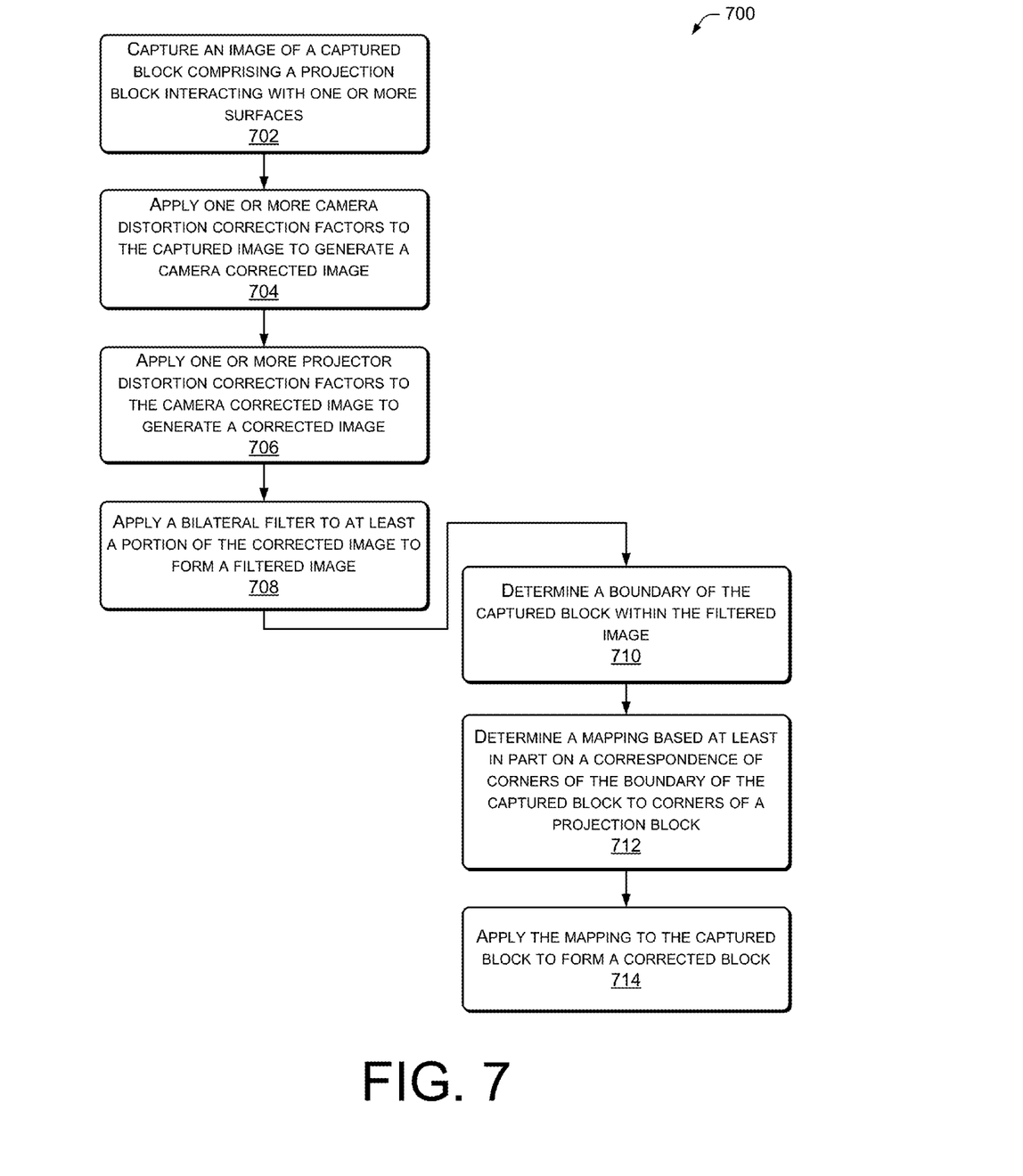
FIG. 7 is an illustrative process of filtering the captured image and determining a boundary of the captured block.

FIG. 7 is an illustrative process 700 of filtering the captured image and determining a boundary of the captured block. In some implementations, the structured light acquisition module 122 may perform the process 700.

At 702, a captured image 312 is acquired of a captured block 314. As described above, the captured block 314 comprises a projection block 302 interacting with one or more objects in the scene 202. The camera 210 may acquire the captured image 312.

At 704, one or more camera distortion correction factors 502 are applied to the captured image 312 to generate a camera corrected image. At 706, one or more projector distortion correction factors 602 are applied to the camera corrected image to generate a corrected image. In some implementations, element 704, 706, or both may be omitted. For example, the camera may comprise an optical assembly configured to use large optical elements such as lenses and place the imaging element of the camera 210 such that camera distortions are below a specified threshold. Or the projector 206 may similarly utilize large optical elements to reduce projection error.

In some implementations, the structured light pattern may be configured to minimize impact of camera or projector distortion on analysis of the image. For example, particularly large features such as bars in the pattern exceeding 20-40 pixels in width may be used. In contrast, where camera and/or projector corrections are applied, bars of 20 pixels or less in width may be used.

At 708, a bilateral filter is applied to at least a portion of the corrected image to form a filtered image. At 710, a boundary of the captured block 314 within the filtered image is determined. Once determined the boundary may be used to recover structured light data. This recovered data may then be used to characterize objects, the environment, and so forth. Determination of the boundary is discussed in more detail below with regards to FIG. 8.

At 712, a mapping based at least in part on a correspondence of points in the boundary of the captured block 314 to corresponding points on the projection block 302 is applied. In some implementation these points may comprise the corners. At 714, the mapping may be applied to the captured block 314 to form a corrected block.

Figure 8:
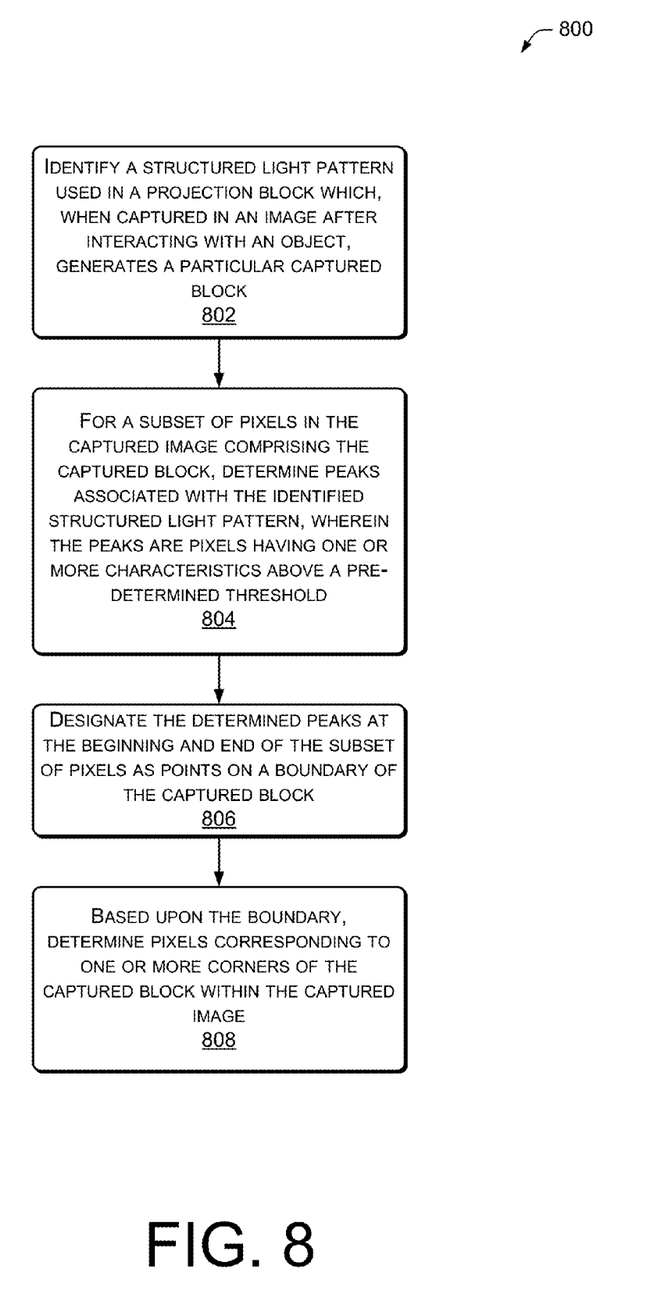
FIG. 8 is an illustrative process of determining the boundary and corners of the captured block.

FIG. 8 is an illustrative process 800 of determining the boundary and corners of the captured block 314. In some implementations, the structured light acquisition module 122 may perform the process 800.

At 802, a structured light pattern used in a projection block 302 is identified, which when projected, generates a particular captured block 314. At 804, for a subset of pixels in a captured image 312 comprising the captured block, peaks associated with the identified structured light pattern are determined. The subset of pixels may vary in size, geometry, arrangement, and so forth. For example, the subset may comprise every row, every other row, every nth row, and so forth. The determined peaks may result from pixels having one or more characteristics above a pre-determined threshold. These characteristics may include chrominance, intensity, and so forth. For example, where the pre-determined threshold designates a peak as being a pixel having a intensity value of greater than 200, a pixel having an intensity of 255 would be designated as a peak.

At 806, the determined peaks at the beginning and end of the subset of pixels are designated as points on a boundary of the captured block 314. Curve or shape fitting techniques may be used to join the points to generate the boundary. The boundary of the captured block 314 within the captured image 312 may, but need not always, comprise straight lines. For example, when projected onto an irregular surface, the boundary may appear to be curved, resulting from changes of the surface.

At 808, based upon the boundary, pixels corresponding to one or more corners of the captured block 314 within the captured image 312 are determined. For example, where two lines segments along the boundary form an interior angle of less than 170 degrees, a point where the two line segments meet may be designated a corner.

In other implementations, other processes may be used to recover the boundary. For example, a neural network may be trained and used to determine the boundaries.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   a projector coupled to the one or more processors and configured to project a projection block comprising a structured light pattern onto a surface of an object within an environment;
   a camera coupled to the one or more processors and configured to capture an image of the object, the captured image containing a captured block that comprises the projection block as projected onto the surface of the object; and
   one or more computer-readable storage media storing computer-executable instructions that, when executed on the one or more processors, cause the one or more processors to perform acts comprising:
   applying distortion correction to at least a portion of the captured image to generate a corrected image, wherein applying the distortion correction compensates for a distortion factor associated with characteristics of the projector;
   applying a bilateral filter to at least a portion of the corrected image to form a filtered image; and
   determining a boundary of the captured block in the filtered image.

2. The system of claim 1, wherein the distortion correction compensates for distortion in the camera when capturing the image.

3. The system of claim 1, the determining of the boundary comprising:
   for at least one of a row or column of pixels in the filtered image, determining one or more peaks of intensity associated with the structured light pattern of the projection block, wherein the peaks are pixels having one or more characteristics above a threshold; and
   designating the one or more determined peaks at a beginning and end of the row or column as points along the boundary.

4. The system of claim 1, the acts further comprising determining a mapping based at least in part on mapping one or more corners of the captured block to corresponding corners of the projection block.

5. The system of claim 4, the acts further comprising applying the mapping to the captured block to form a corrected block.

6. The system of claim 1, wherein the applying of the bilateral filter comprises replacing an intensity value of a pixel with a weighted average of intensity values from other pixels within a pre-determined distance of the pixel.

7. The system of claim 1, wherein the structured light pattern of the projection block comprises a regular periodic arrangement of pixels having at least two intensities.

8. One or more non-transitory computer-readable storage media storing instructions that, when executed by one or more processors, cause the one or more processors to perform acts comprising:
   receiving a captured image that includes a captured block, the captured block comprising a projection block after interaction with a surface;
   applying one or more corrections to the captured image, wherein applying the one or more corrections compensates for distortion associated with characteristics of a projector that presents the projection block on the surface;
   applying a bilateral filter to at least a portion of the captured image to form a filtered image; and determining at least a portion of a boundary of the captured block within the filtered image.

9. The one or more computer-readable storage media of claim 8, wherein the entire captured block is present within the captured image.

10. The one or more computer-readable storage media of claim 8, wherein the projection block comprises a structured light pattern that has been projected onto the surface.

11. The one or more computer-readable storage media of claim 8, wherein the one or more corrections compensate for distortion associated with characteristics of a camera that receives the captured image.

12. The one or more computer-readable storage media of claim 8, the acts further comprising:
   mapping points on at least a portion of the boundary of the captured block to corresponding corners of the projection block; and
   determining a transform based at least in part on the mapping.

13. The one or more computer-readable storage media of claim 12, the acts further comprising applying the transform to the captured block to form a corrected block.

14. The one or more computer-readable storage media of claim 8, wherein the determining at least a portion of the boundary of the captured block within the filtered image comprises:
   identifying a structured light pattern used to generate the projection block;
   for each row or column of pixels within at least a portion of the filtered image, determining pixels corresponding to transitions between two or more intensity states in the structured light pattern; and
   designating the determined pixels at the beginning and end of the row or column as points on the boundary of the captured block.

15. One or more non-transitory computer-readable storage media storing instructions that, when executed by one or more processors, cause the one or more processors to perform acts comprising:
   accessing a captured image comprising a structured light pattern interacting with a surface;
   applying one or more corrections to the captured image, wherein applying the one or more corrections compensates for distortion associated with characteristics of a projector that presents the structured light pattern on the surface;
   applying a bilateral filter to at least a portion of the captured image to form a filtered image; and
   determining at least a portion of a boundary of the structured light pattern within the filtered image.

16. The one or more computer-readable storage media of claim 15, wherein the bilateral filter is configured to be proportionate to a feature size of the structured light pattern.

17. The one or more computer-readable storage media of claim 15, the acts further comprising mapping points of the structured light pattern in the captured image to corresponding points in the structured light pattern prior to projection.

18. The one or more computer-readable storage media of claim 15, wherein the structured light pattern is imperceptible to a human when projected.

\* \* \* \* \*